UNITED STATES PATENT OFFICE.

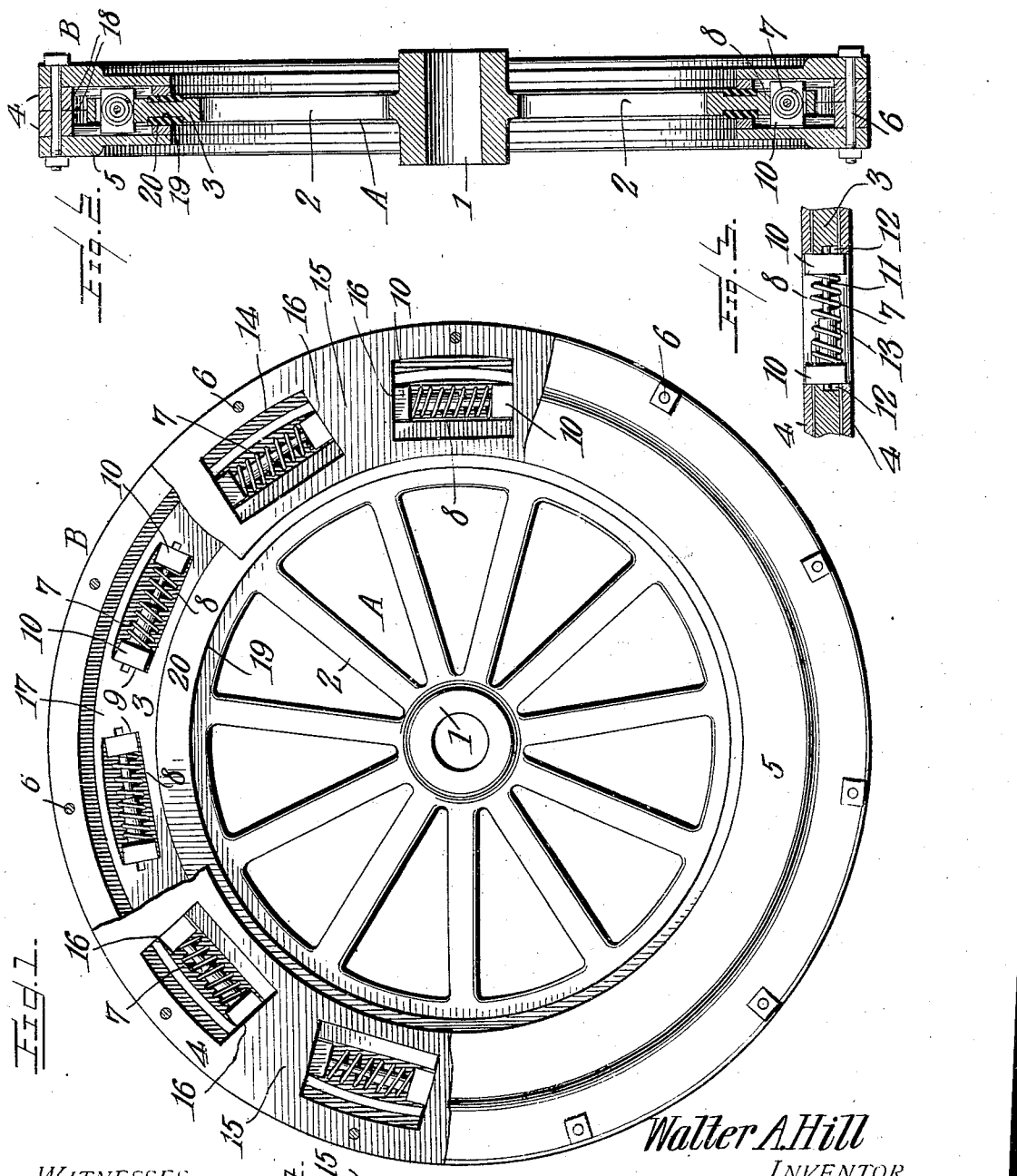

WALTER A. HILL, OF CALLICOON, NEW YORK, ASSIGNOR OF ONE-HALF TO VALENTINE SCHEIDELL AND GUERNSEY MEYERS, OF CALLICOON, NEW YORK.

SPRING-CUSHIONED AUTOMOBILE-WHEEL.

No. 870,171.

Specification of Letters Patent.

Patented Nov. 5, 1907.

Application filed January 2, 1907. Serial No. 350,392.

*To all whom it may concern:*

Be it known that I, WALTER A. HILL, a citizen of the United States, residing at Callicoon, in the county of Sullivan and State of New York, have invented a new and useful Spring-Cushioned Automobile-Wheel, of which the following is a specification.

This invention relates to a vehicle wheel of that type comprising two sections which are free to assume an eccentric relation and provided with suitable cushioning means between the two sections, so as to absorb the shocks and vibrations due to irregularities in the roadbed.

The invention has for one of its objects to improve and simplify the construction and operation of wheels of this character, so as to be comparatively inexpensive to construct and keep in order and to have superior wearing qualities.

A further object of the invention is to provide a wheel composed of a body section of any desired form and a rim or tread section mounted on the same with suitably arranged compression springs on one section and means on the other section which cause the springs to contract by the relative movement of the two sections occasioned by jolts or shocks, so that the vehicle will ride easy and be free from annoyances to the occupants.

With these objects in view, and others, as will appear as the nature of the invention is better understood, the invention comprises the various novel features of construction and arrangement of parts, which will be more fully described hereinafter and set forth with particularity in the claims appended hereto.

In the accompanying drawing, which illustrates one of the embodiments of the invention, Figure 1 is a front elevation of the wheel showing portions of the rim section broken away. Fig. 2 is a transverse section of the wheel. Fig. 3 is a detail view of one of the cushioning springs. Fig. 4 is a fragmentary perspective view of one of the wedge carrying rings of the rim or tread section.

Corresponding parts in the several figures are indicated throughout by similar characters of reference.

Referring to the drawing, A designates the body section and B the tread or rim section of the wheel.
The body section comprises the hub 1, spokes 2 and felly 3, which may be of ordinary construction. In the present instance, the body is illustrated as a unitary structure, such as an aluminium or other metal casting.

The rim section comprises a pair of inner rings 4 which are disposed on opposite sides of the felly 3, and a pair of side cover plates 5 preferably in the form of rings of the same radial dimension as the rings 4. The rings and cover plates are rigidly secured together by a number of spaced through bolts 6, and the peripheries of rings and plates are flush, so as to form collectively the tread of the wheel. These several parts are preferably of metal, so that the circumference of the wheel will possess good wearing qualities. The two sections A and B of the wheel are relatively movable and are adapted to move freely from a concentric to an eccentric position, or vice versa, suitable devices being employed for cushioning the movement of one section with respect to the other.

The cushioning devices comprise a plurality of helical compression springs 7 of suitable stiffness, which are disposed in spaced peripheral notches 8 in the felly 3. Each notch 8 has parallel end walls 9 which form abutments for wearing blocks 10 against which the ends of the spring in the said notch bear. Extending through each spring and the bearing blocks 10 thereof is a rod 11 arranged with its extremities engaging in recesses 12, as shown in Fig. 3, so as to retain the spring and bearing blocks in proper position. To prevent the spring from buckling, a sleeve 13 is arranged on one of the bearing blocks 10 and extends into the center of the spring. By this means, the bearing blocks 10 are free to move toward or away from each other on the retaining rod 11. As shown in Figs. 2 and 3, the blocks 10 extend from opposite sides of the felly 3, and these projecting ends are engaged by the approximately parallel end walls of slots 14 formed in the rings 4. By making the end walls of such slot parallel or approximately parallel with each other, the space or webs 15 between adjacent slots will form wedges whose inclined surfaces 16 engage the projecting ends of adjacent blocks 10. These webs are at the sides of the arms 17 of felly 3 formed by the notches 8, and as the wheel rotates, the springs will successively compress and the weight transferred from point to point, so that the body section of the wheel will be cushioned on the tire section. The rings 4 extend outwardly beyond the felly 3, and on the opposed faces of the rings are laterally extending flanges 18 which abut, as shown in Fig. 2, the said flanges serving as spacers to hold the plate portions of the rings a suitable distance apart to accommodate the felly of the body section between them. Annular grooves 19 are provided on the opposite sides of the felly 3, and in these grooves are arranged fiber washers 20 against which the inner surfaces of the rings 4 bear, as shown more clearly in Fig. 2. These washers coöperate with the cover plates 5 to form a complete housing for the cushioning devices.

From the foregoing description, taken in connection with the accompanying drawings, the advantages of the construction and of the method of operation will be readily understood.

The two sections of the wheel are of simple and substantial construction and the cushioning devices between them serve to absorb the shocks and jolts resulting from the obstructions and inequalities in the roadway, and insure the easy running of the vehicle equipped with the wheels.

I have described the principle of operation of the invention, together with the apparatus which I now consider to be the best embodiment thereof, but I desire to have it understood that the device shown is merely illustrative, and that various changes may be made, when desired, as are within the scope of the claims.

What is claimed is:—

1. The combination in a wheel, of a body section, the rim portion of which is provided with a plurality of openings, independent compression springs arranged within the openings, said springs being arranged in an annular series, blocks at the end of the springs, said blocks projecting beyond the sides of the body section, and a tire section having openings, the end walls of which form wedges for engagement with the projecting blocks to thereby compress the springs in successive order during the rotation of the wheel.

2. A wheel comprising a body section having a notched felly, springs arranged in the notches of the felly, members interposed between the ends of the springs and end walls of the notches and projecting from opposite sides of the felly, and a tire section having a pair of plates provided with slots arranged with their end walls engaging the said members to compress the springs by the relative movement of the body and tire sections.

3. A wheel comprising a body section having a notched felly, a compression spring in each notch, members at the ends of the springs projecting from opposite sides of the felly, a pair of plates disposed at the sides of the felly and movable with respect thereto and having slots forming wedges between the adjacent members of juxtaposed springs, and cover plates secured to the said slotted plates.

4. A wheel comprising a body section, a rim section movable with respect thereto, and a plurality of cushioning devices between the sections, each device comprising a compressible member on one section and wedges on the other section operating on the said member, the compression force being exerted lengthwise of the cushioning devices, and in a direction substantially concentric with the periphery of the wheel.

5. A wheel comprising a body section, a rim section movable with respect thereto, and a plurality of cushioning devices between the sections, each device comprising a compression spring, members arranged at the ends thereof, and wedges engaging the said members to compress the spring, each spring being helical in form and compressible endwise, and in a direction approximately concentric to the periphery of the wheel.

6. A wheel comprising a body section, a rim section movable with respect thereto, and a plurality of cushioning devices between the sections, each device comprising a compression spring and members arranged at the ends thereof, a rod extending through the spring and members for holding the same on one section, and wedges on the other section engaging the said members to compress the spring.

7. A wheel comprising a body section having a felly, a rim section, and cushioning devices between the same, said rim section comprising a pair of rings disposed on opposite sides of the felly and projecting outwardly over the latter, cover plates disposed on the outside of the rings, bolts passing through the rings and plates, and washer plates arranged between the felly and rings.

In testimony that I claim the foregoing as my own, I have hereto affixed my signature in the presence of two witnesses.

WALTER A. HILL.

Witnesses:
JOHN JAEGER,
MAME S. ANDERSON.